United States Patent
Ji et al.

(10) Patent No.: US 8,473,802 B2
(45) Date of Patent: Jun. 25, 2013

(54) TECHNIQUE FOR ADVANCED ARQ BUFFER MANAGEMENT IN WIRELESS COMMUNICATION SYSTEM

(75) Inventors: Baowei Ji, Plano, TX (US); Youngbin Chang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 12/813,183

(22) Filed: Jun. 10, 2010

(65) Prior Publication Data

US 2010/0332936 A1 Dec. 30, 2010

Related U.S. Application Data

(60) Provisional application No. 61/269,857, filed on Jun. 30, 2009.

(51) Int. Cl.
*H04L 1/18* (2006.01)
(52) U.S. Cl.
USPC .......................................... 714/748; 370/376
(58) Field of Classification Search
USPC ......... 370/236, 229, 395.4, 429, 376; 710/52; 705/9; 714/748, 769, 749
See application file for complete search history.

(56) References Cited

U.S. PATENT DOCUMENTS

| | | | |
|---|---|---|---|
| 6,560,199 B1 * | 5/2003 | Hoshino | 370/236 |
| 7,453,799 B2 * | 11/2008 | Mangin et al. | 370/229 |
| 7,885,270 B2 * | 2/2011 | Frink et al. | 370/395.4 |
| 2004/0111541 A1 * | 6/2004 | Meyer et al. | 710/52 |
| 2005/0152350 A1 | 7/2005 | Sung et al. | |
| 2006/0227799 A1 * | 10/2006 | Lee | 370/429 |
| 2006/0271420 A1 * | 11/2006 | Anselmann et al. | 705/9 |
| 2007/0189206 A1 | 8/2007 | Chandra et al. | |
| 2008/0101290 A1 | 5/2008 | Sung et al. | |

FOREIGN PATENT DOCUMENTS

| KR | 10-0600607 B1 | 7/2006 |
|---|---|---|
| KR | 10-0612654 B1 | 8/2006 |

OTHER PUBLICATIONS

W.C.Shin, et al., "Occupancy Regulation for Re-ordering Buffer at 3GPP's ARQ", Proceedings of 2004 IEEE International Conference on Communications, vol. 6, Jun. 24, 2004.

* cited by examiner

*Primary Examiner* — David Ton
(74) *Attorney, Agent, or Firm* — Jefferson IP Law, LLP

(57) ABSTRACT

An Automatic Repeat reQuest (ARQ) transmitter for use in a wireless communication system and method for its operation are provided. The method includes determining unutilized capacity of an ARQ receiver buffer in an ARQ receiver, determining if the ARQ receiver buffer can support an ARQ block to be transmitted based on the determined unutilized capacity of the ARQ receiver buffer, and if it is determined that the ARQ receiver buffer can support the ARQ block to be transmitted, transmitting the ARQ block to the ARQ receiver.

26 Claims, 12 Drawing Sheets

TECHNIQUE FOR ADVANCED ARQ BUFFER MANAGEMENT IN WIRELESS COMMUNICATION SYSTEM

CROSS-REFERENCE TO RELATED APPLICATIONS

This application claims the benefit under 35 U.S.C. §119 (e) of a U.S. Provisional application filed on Jun. 30, 2009 in the U.S. Patent and Trademark Office and assigned Ser. No. 61/269,857, the entire disclosure of which is hereby incorporated by reference.

BACKGROUND OF THE INVENTION

1. Field of the Invention

Aspects of the present invention relate to Automatic Repeat reQuest (ARQ) in a wireless communication system. More particularly, aspects of the present invention relate to techniques for advanced ARQ buffer management in a wireless communication system.

2. Description of the Related Art

According to a channel status of a radio resource, a wireless communication system may encounter an error in data transmitted and received. Hence, the wireless communication system may control or restore the data error using an Automatic Repeat reQuest (ARQ) scheme to raise transmission reliability.

Using the ARQ scheme, an ARQ receiver informs an ARQ transmitter of whether an ARQ block of data (hereafter referred to as an AQR block) is successfully received from the ARQ transmitter. For example, when the ARQ block received from the ARQ transmitter is free from error, the ARQ receiver transmits an ACKnowledge (ACK) to the ARQ transmitter. When the ARQ block received from the ARQ transmitter is corrupt, the ARQ receiver transmits a Negative ACK (NACK) to the ARQ transmitter. Herein, a series of operations of the ARQ receiver for transmitting the reception success or failure of the ARQ block to the ARQ transmitter is referred to as ARQ feedback.

Accordingly, the ARQ transmitter may acquire a reception status of the ARQ block transmitted to the ARQ receiver based on the ACK/NACK received from the ARQ receiver. When receiving the ACK from the ARQ receiver, the ARQ transmitter transmits a new ARQ block to the ARQ receiver. In contrast, when receiving the NACK information from the ARQ receiver, the ARQ transmitter retransmits the ARQ bock corresponding to the NACK to the ARQ receiver.

The ARQ scheme may be implemented differently for different wireless communication standards. An example of an ARQ transmission scheme utilized in the in the Institute of Electrical and Electronics Engineers (IEEE) 802.16e and the IEEE 802.16m standards is described below with reference to FIG. 1.

FIG. 1 illustrates an ARQ transmitter state machine for an ARQ block according to the related art.

Referring to FIG. 1, communication of an ARQ block may be in one of five states, namely a not-sent state 110, an outstanding state 120, a discarded state 130, a waiting-for-retransmission state 140, and a done state 150. Each ARQ enabled connection has an independent ARQ state machine. The minimum unit of an ARQ state transition is an ARQ block. An ARQ block begins at the not-sent state 110 before the ARQ block is initially transmitted.

When the ARQ block is transmitted, an ARQ_BLOCK_LIFETIME timer is initiated for the ARQ block and the ARQ block state transitions from the not-sent state 110 to the outstanding state 120 in step 112. When this occurs, an ARQ_TX_NEXT_SN parameter is incremented by one.

While the ARQ block is in the outstanding state 120, the ARQ transmitter waits for one of an ACK and a NACK from the corresponding ARQ receiver. If the ACK arrives, the ARQ block state transitions to the done state 150 in step 125. If the NACK arrives, the ARQ block state transitions to the waiting-for-retransmission state 140 in step 124. After the ARQ_BLOCK_LIFETIME period expires, the ARQ block state transitions to the discard state 130 in step 123.

While the ARQ block is in the waiting-for-retransmission state 140, the ARQ transmitter prepares for retransmission of the ARQ data corresponding to the ARQ block. If an ACK arrives, the ARQ block state transitions to the done state 150 in step 145. If the ARQ data corresponding to the ARQ block is re-transmitted, the ARQ block state transitions back to the outstanding state 120 in step 142. After the ARQ_BLOCK_LIFETIME timer expires, the ARQ block state transitions to the discard state 130 in step 143 without being retransmitted.

While the ARQ block is in the discard state 130, the ARQ transmitter sends a discard message and waits for an ACK from the ARQ receiver. If an ACK for the discard message or the ARQ block arrives, the ARQ block state transitions to the done state 150 in step 135.

When the ARQ block is in the done state 150, the ARQ transmitter completes the ARQ operation by erasing all the timers and ARQ state variables related to the ARQ block.

Each ARQ transmitter maintains an ARQ transmitting window with two parameters, namely an ARQ_TX_WINDOW_START parameter and the ARQ_TX_NEXT_SN parameter. The ARQ state machine regards all ARQ blocks up to ARQ_TX_WINDOW_START−1 as being acknowledged by the corresponding ARQ receiver. The ARQ_TX_WINDOW_START parameter represents the lower edge of the ARQ window in the ARQ transmitter. When the corresponding ARQ block of the ARQ_TX_WINDOW_START parameter in the ARQ state machine transitions to the done state 150, the ARQ_TX_WINDOW_START parameter moves to the next lowest ARQ Sequence Number (SN) that is not acknowledged by the ARQ receiver. The ARQ_TX_NEXT_SN parameter corresponds to the lowest SN which is the next ARQ block to be sent by the ARQ transmitter. The ARQ_TX_NEXT_SN parameter shall be within the interval from ARQ_TX_WINDOW_START to ARQ_TX_WINDOW_START+ARQ_WINDOW_SIZE.

Each ARQ receiver maintains an ARQ receiving window with two parameters, namely an ARQ_RX_WINDOW_START parameter and an ARQ_RX_HIGHEST_SN parameter. The ARQ state machine regards all ARQ blocks up to ARQ_RX_WINDOW_START−1 as being received. The ARQ_RX_WINDOW_START parameter represents the lower edge of ARQ window in the ARQ receiver. When the corresponding ARQ block of ARQ_RX_WINDOW_START is received correctly or after the expiration of an ARQ_RX_PURGE_TIMEOUT timer, ARQ_RX_WINDOW_START moves to the next lowest ARQ SN which is not received.

The ARQ_RX_HIGHEST_SN parameter corresponds to the ARQ SN of the highest ARQ block received, plus one. The ARQ_RX_HIGHEST_SN parameter shall be within the interval from ARQ_RX_WINDOW_START to ARQ_RX_WINDOW_START+ARQ_WINDOW_SIZE.

An example of an ARQ reception scheme utilized in the in the IEEE 802.16e and the IEEE 802.16m standards is described below with reference to FIG. 2.

FIG. 2 illustrates a flowchart for reception of an ARQ block according to the related art.

Referring to FIG. 2, when a Media Access Control (MAC) Packet Data Unit (PDU) is received in step 202, the AQR receiver checks a Fragmentation and Packing Extended Header (FPEH) and obtains ARQ block information for ARQ reception. After the ARQ receiver knows an ARQ SN and corresponding ARQ block, an ARQ receiver state machine adds the SN to the list of SNs to be acknowledged in step 204. The ARQ receiver state machine checks the validity of the SN by determining if the SN falls within the ARQ receiver window range (i.e., from ARQ_RX_WINDOW_START to ARQ_RX_WINDOW_START+ARQ_WINDOW_SIZE) in step 206. If an ARQ block is not valid (i.e., the ARQ block is not within the ARQ receiver window range), the receiver discards the ARQ block in step 208.

If ARQ SN is valid (i.e., the ARQ block is within the ARQ receiver window range), it is determined if the corresponding ARQ block is already received in step 210. If it is determined that the ARQ block is already received, the ARQ receiver state machine resets an ARQ_RX_PURGE_TIMEOUT timer in step 212 and discards the ARQ block in step 208. Here, the corresponding ARQ block is discarded because it is a duplicate block which should not be stored in a buffer. However, if it is determined that the ARQ block is not duplicated, the ARQ receiver state machine begins a procedure to update ARQ state variables and related timers in steps 214-224 and store the ARQ block in the buffer in step 226.

More specifically, if it is determined that the ARQ block is not duplicated, it is determined if the SN is greater than or equal to ARQ_RX_HIGHEST_SN in step 214. If it is determined that the SN is less than ARQ_RX_HIGHEST_SN, the procedure proceeds to step 218. However, if it is determined that the SN is greater than or equal to ARQ_RX_HIGHEST_SN, the ARQ receiver updates ARQ_RX_HIGHEST_SN as SN+1 in step 216 and proceeds to step 218.

In step 218, it is determined if SN is equal to ARQ_RX_WINDOW_START. If it is determined that SN is equal to ARQ_RX_WINDOW_START, ARQ_RX_WINDOW_START is advanced to the next lowest numbered ARQ block that has not been received in step 220, ARQ_SYNC_LOSS_TIMEOUT is reset in step 222 and the ARQ block is stored in step 226. However, if it is determined that the SN is not equal to ARQ_RX_WINDOW_START, the ARQ receiver marks the block as received and resets the ARQ_RX_PURGE_TIMEOUT timer for this SN in step 224. The ARQ block is then stored in step 226.

The ARQ receiver sends ARQ feedback using an ARQ feedback Information Element (IE) to update ARQ block reception status when an ARQ feedback poll is received from the ARQ transmitter or when an ARQ block has been missing for amount of time corresponding to DELIVERY_IN_ORDER_TIMEOUT.

When the ARQ transmitter receives the ARQ feedback IE, which does not include a selective ACK MAP, the ARQ transmitter considers all ARQ blocks in the interval ARQ_TX_WINDOW_START to SN (inclusive) as acknowledged, and sets ARQ_TX_WINDOW_START to SN+1. When the ARQ feedback IE includes the selective ACK MAP, the ARQ transmitter considers all ARQ blocks in the interval ARQ_TX_WINDOW_START to SN (not inclusive) as acknowledged, and sets ARQ_TX_WINDOW_START to SN. The Most Significant Bit (MSB) of the selective ACK MAP indicates an SN in ARQ feedback IE, which shall start from a NACK, and contiguous bits in the selective ACK MAP may be marked as an ACK or a NACK. The ARQ transmitter only considers valid ACKs within the ARQ window (i.e., ARQ_TX_WINDOW_START+ARQ_WINDOW_SIZE). ACKs outside the ARQ widow are ignored by the ARQ transmitter.

When a discard message is received from the ARQ transmitter, the ARQ receiver sends an ACK to the ARQ transmitter and discards the corresponding blocks in the discard message. The ARQ_RX_WINDOW_START moves to the next lowest SN of the ARQ block not yet received within the ARQ receiving window.

MAC Service Data Units (SDUs) are reconstructed from ARQ blocks in sequence. When a new ARQ block is received, the ARQ receiver checks if a complete SDU is able to be reconstructed. If a complete SDU can be reconstructed, it is then transferred to an upper layer, otherwise, the ARQ block is buffered and the ARQ receiver waits for other ARQ blocks in order to reconstruct the SDU. When an ARQ block is skipped, ARQ blocks related to the reconstruction of the SDU are flushed from the buffer.

Both IEEE 802.16e and IEEE 802.16m support packing SDUs when forming a PDU, as well as fragmentation and reassembly. Herein, both variable and fixed length SDUs are supported by the IEEE 802.16e and IEEE 802.16m standards. More specifically, IEEE 802.16e defines a Fragmentation SubHeader (FSH) and a Packing SubHeader (PSH) to support variable length SDUs, examples of the format of which are shown below in Tables 1 and 2, respectively.

TABLE 1

| Syntax | Size (bit) | Notes |
|---|---|---|
| Packing Subheader( ){ | — | — |
|   FC | 2 | Indicates the fragmentation state of the payload:<br>00 = no fragmentation<br>01 = last fragmentation<br>10 = first fragment<br>11 = continuing (middle) fragment |
|   if (ARQ-enabled Connection) | — | — |
|     BSN | 11 | Sequence number of the first block in the current SDU fragment. |
|   else { | — | — |
|     if (Type bit Extended Type) | — | — |
|       FSN | 11 | Sequence number of the current SDU fragment. The FSN value shall increment by one (modulo 2048) for each fragment, including unfragmented SDUs and unpacked SDU or SDU fragments. |

TABLE 1-continued

| Syntax | Size (bit) | Notes |
|---|---|---|
| else | — | — |
|     FSN | 3 | Sequence number of the current SDU fragment. The FSN value shall increment by one (modulo 8) for each fragment, including unfragmented SDUs and unpacked SDU or SDU fragments. |
| } | — | — |
| Length | 11 | Length of the SDU fragment in bytes including the PSH. |
| } | — | — |

TABLE 2

| Syntax | Size (bit) | Notes |
|---|---|---|
| Packing Subheader( ){ | — | — |
|   FC | 2 | Indicates the fragmentation state of the payload:<br>00 = no fragmentation<br>01 = last fragmentation<br>10 = first fragment<br>11 = continuing (middle) fragment |
|   if (ARQ-enabled Connection) | — | — |
|     BSN | 11 | Sequence number of the first block in the current SDU fragment. |
|   else { | — | — |
|     if (Type bit Extended Type) | — | — |
|       FSN | 11 | Sequence number of the current SDU fragment. The FSN value shall increment by one (modulo 2048) for each fragment, including unfragmented SDUs and unpacked SDU or SDU fragments. |
|     else | — | — |
|       FSN | 3 | Sequence number of the current SDU fragment. The FSN value shall increment by one (modulo 8) for each fragment, including unfragmented SDUs and unpacked SDU or SDU fragments. |
|   } | — | — |
|   Reserved | 3 | Shall be set to zero. |
| } | — | — |

Regarding Tables 1 and 2, FSH is substantially the same as PSH except the 11-bit "Length" field is replaced with a 3-bit "Reserved" field. FSH is used when the payload in a MAC PDU includes only one fragment SDU. This is why the "Length" field is not needed, because the generic MAC Header already has a length field. An example of variable-length SDUs packed into MAC PDUs including FSHs and PSHs based on IEEE 802.16e is described below with reference to FIG. 3.

FIG. 3 illustrates variable-length MAC SDUs packed into MAC PDUs including FSHs and PSHs according to the related art.

Regarding FIG. 3, r MAC SDUs 302, s−r+1 MAC PDUs 304, and t MAC SDUs 306 are shown. Each of the s−r+1 MAC PDUs 304 only has one SDU fragment and thus each SDU begins with one FSH. In contrast, the r MAC SDUs 302 and the t MAC SDUs 306 are each included in one MAC PDU that includes unfragmented SDUs and SDU fragments and therefore each SDU or SDU fragment begins with a PSH.

An ARQ receiver assembles MAC PDUs in order of the FSN, and uses a 2 bit Fragment Control (FC) field to divide the PDUs into groups and form SDUs. An SDU could be formed from just one data segment with an FC of "00". Otherwise, an SDU is formed starting from one fragment with an FC of "10", zero or more fragments with an FC of "11", and ending with one fragment with an FC of "01".

An example of packing fixed-length SDUs into a MAC PDU based on IEEE 802.16e is described below with reference to FIG. 4.

FIG. 4 illustrates fixed-length MAC SDUs packed into one MAC PDU according to the related art.

Regarding FIG. 4, k fixed-length MAC SDUs are packed into one MAC PDU, where an integer number of SDUs are packed one after the other. Given the length of the entire MAC PDU, the number of packed SDUs is equal to the length of the MAC PDU minus the MAC header, and divided by the predefined length of the SDU.

Another ARQ scheme according to the related art is found in 3$^{rd}$ Generation Partnership Project (3GPP) Evolved-Universal Mobile Telecommunications System (UMTS) Terrestrial Radio Access Network (E-UTRAN), a.k.a., Long Term Evolution (LTE). An example of a Radio Link Control (RLC) PDU structure is described below with reference to FIG. 5.

FIG. 5 illustrates an RLC PDU structure according to the related art.

Regarding FIG. 5, shown are SDUs of variable length, from which variable-length PDUs are formed. An LTE PDU (e.g., RLC PDU k) may consist of zero or one of the last fragment of the previous SDU (n), zero or more individual SDUs (e.g., n+1 and n+2), and zero or one of the first fragment of the next SDU (e.g., n+3). Alternatively, a PDU (e.g., RLC PDU) may consist of just one fragment in the middle of an SDU (e.g., n+3).

Herein, rather than using one FC field for each PSH as employed by the IEEE 802.16e and IEEE 802.16m standards, the RLC protocol utilized by the LTE standard uses a Framing Info (FI) field. If all PDUs arrive at the ARQ receiver successfully, the ARQ receiver may arrange the PDUs in the order of the SN, and find the start and end points of each SDU by checking the FI fields. The FI field is a 2-bit field that indicates whether an RLC SDU is segmented at the beginning and/or at the end of a data field. More specifically, the FI field indicates whether the first byte of the data field corresponds to the first byte of an RLC SDU, and whether the last byte of the data field corresponds to the last byte of an RLC SDU. The interpretation of the FI field is provided below in Table 3.

TABLE 3

| Value | Description |
|---|---|
| 00 | First byte of the Data field corresponds to the first byte of a RLC SDU. Last byte of the Data field corresponds to the last byte of a RLC SDU. |
| 01 | First byte of the Data field corresponds to the first byte of a RLC SDU. Last byte of the Data field does not correspond to the last byte of a RLC SDU. |
| 10 | First byte of the Data field does not correspond to the first byte of a RLC SDU. Last byte of the Data field corresponds to the last byte of a RLC SDU. |
| 11 | First byte of the Data field does not correspond to the first byte of a RLC SDU. Last byte of the Data field does not correspond to the last byte of a RLC SDU. |

An example of Unacknowledged Mode Data (UMD) is described below with reference to FIG. 6.

FIG. 6 illustrates a UMD PDU according to the related art.

Referring to FIG. 6, a UMD PDU with 5-bit SN is shown. Herein, the UMD PDU has an odd number of Length Indicator (LI) fields (i.e., K=1, 3, 5, etc.). The LI fields indicate the length in bytes of a corresponding data field element present in an RLC data PDU delivered/received by an Unacknowledged Mode (UM) entity or an Acknowledged Mode (AM) RLC entity. The first LI present in the RLC data PDU header corresponds to the first data field element present in the data field of the RLC data PDU, the second LI present in the RLC data PDU header corresponds to the second data field element present in the data field of the RLC data PDU, and so on. The value 0 for the LI field is reserved.

The SN field is 10 bits for an Acknowledged Mode Data (AMD) PDU, AMD PDU segments and STATUS PDUs, and is 5 bits or 10 bits (configurable) for a UMD PDU. The SN field indicates the sequence number of the corresponding UMD or AMD PDU. For an AMD PDU segment, the SN field indicates the sequence number of the original AMD PDU from which the AMD PDU segment was constructed from.

The Extension (E) bit field is a one bit field. The E field indicates whether a data field follows or a set of an E field and an LI field follows.

The ARQ operation employed by the LTE standard, known as AM Acknowledged Mode (AM), uses parameters that are different from those used by the IEEE 802.16e and IEEE 802.16m standards. More specifically, the ARQ transmitter uses a transmitting window that has three parameters, namely VT(A), VT(MS) and VT(S).

VT(A) is a state variable that holds the value of the SN of the next AMD PDU for which an ACK is to be received in-sequence, and it serves as the lower edge of the transmitting window. VT(A) is updated whenever the AM RLC entity receives an ACK for an AMD PDU with SN=VT(A).

VT(MS) is a state variable equal to VT(A)+AM_Window_Size, and it serves as the higher edge of the transmitting window.

VT(S) is a state variable that holds the value of the SN to be assigned for the next newly generated AMD PDU. VT(S) is updated whenever the AM RLC entity delivers an AMD PDU with SN=VT(S).

The ARQ receiver uses a receiving window that has five parameters, namely VR(R), VR(MR), VR(H), VR(MS), and VR(X).

VR(R) is a state variable that hold the value of the SN following the last in-sequence completely received AMD PDU, and it serves as the lower edge of the receiving window. VR(R) is updated whenever the AM RLC entity receives an AMD PDU with SN=VR(R).

VR(MR) is a state variable that equals VR(R)+AM_Window_Size, and it holds the value of the SN of the first AMD PDU that is beyond the receiving window and serves as the higher edge of the receiving window.

VR(H) is a state variable that holds the value of the SN following the SN of the RLC data PDU with the highest SN among received RLC data PDUs.

VR(MS) is a state variable that holds the highest possible value of the SN which can be indicated by "ACK_SN" when a STATUS PDU needs to be constructed.

VR(X) is a state variable that holds the value of the SN following the SN of the RLC data PDU which triggered T_reordering.

In a summary, IEEE 802.16e, IEEE 802.16m and LTE standards allow an ARQ transmitter to fragment packets coming from an upper layer in order to form an SDU. The fragmentation is indicated by the "FC" field in the IEEE 802.16e and IEEE 802.16m standards (see Tables 1 and 2) and the "FI" field in the LTE standard (see Table 3). Therefore, when an ARQ receiver has received an ARQ block with SN equal to the lower edge of the ARQ receiving window (i.e., ARQ_RX_WINDOW_START in IEEE 802.16e and IEEE 802.16m, and VR(R) in LTE), the ARQ receiver will advance the receiving window and transmit an ACK to the ARQ transmitter. However, this does not necessarily mean that the ARQ receiver can remove that ARQ block from the receiving buffer and deliver it to the upper layer, because a complete SDU has to first be formed.

For example, consider the scenario in FIG. 5. Here RLC PDU k−1 cannot be removed from the receiving buffer until RLC PDU k has also arrived because RLC SDU n cannot be reconstructed by RLC PDU k−1 itself. Similarly, RLC PDU k+1 cannot be removed from the receiving buffer until both RLC PDU k and RLC PDU k+2 have also arrived because RLC SDU n+3 cannot be reconstructed by RLC PDU k+1 itself. Thus, RLC PDU k+1 will have to wait for more RLC PDUs before being removed from the ARQ receiving buffer and delivered to the upper layer, depending on how RLC SDU n+3 was fragmented.

Accordingly, flow control is important when employing ARQ so that an ARQ transmitter does not overflow a buffer in an ARQ receiver. This issue is particularly important for wireless communication systems, where a Mobile Station (MS) typically has a limited buffer. Herein, buffer management is employed in the related art to address overflow a buffer in an ARQ receiver. Buffer management according to the related art is described below.

To facilitate buffer management, an ARQ receiver informs an ARQ transmitter of a maximum ARQ buffer size (ARQ_MAX_BUFFER_SIZE) during a capability negotiation. ARQ_MAX_BUFFER_SIZE is the maximum size of the ARQ buffer (in bytes) that the ARQ receiver is able to allocate for all ARQ connections. When there are one or more ARQ enabled flows for a given ARQ receiver, the ARQ transmitter maintains the state ARQ_BUFFER_USED, which is the total ARQ buffer usage of all ARQ enabled flows at the ARQ receiver, in addition to other per flow ARQ states. ARQ_BUFFER_USED accounts for all ARQ blocks and subblocks that have not yet been acknowledged in-order by the ARQ receiver. For example, if the ARQ transmitter sent blocks 0 to 10 and the ARQ receiver acknowledges blocks 1 to 10, the ARQ_BUFFER_USED shall consider PDUs with numbers 0 to 10 as occupying the AQR receiver's buffer. Once block 0 is also acknowledged, ARQ_BUFFER_USED is updated to indicate that blocks 0 to 10 have been cleared from the ARQ receiver's buffer. The ARQ transmitter ensures that the transmission or retransmission of ARQ blocks does not to exceed ARQ_MAX_BUFFER_SIZE−ARQ_BUFFER_USED.

However, one drawback with the buffer management of the related art is that an ARQ transmitter may still overflow the ARQ buffer in an ARQ receiver, because it assumes that all ARQ blocks (e.g., blocks 0 to 10) that have been accumulatively acknowledged by the ARQ receiver have been delivered to upper layer, and thus are no longer in the ARQ receiving buffer. However, this is not necessarily the case. Actually, an ARQ block which is a fragment of an MAC SDU cannot be delivered to upper layer until all the fragments have arrived at the ARQ receiver. In other words, an ARQ block may still be in the ARQ receiving buffer even if it is acknowledged by the ARQ receiver and the ARQ receiving window has moved beyond this ARQ block. Thus, the buffer management in the related art does not consider the SDU reconstruction issue, and thus the transmitter may overflow the ARQ buffer in an ARQ receiver.

Therefore, a need exists for techniques for advanced ARQ buffer management in a wireless communication system.

SUMMARY OF THE INVENTION

An aspect of the present invention is to address at least the above-mentioned problems and/or disadvantages and to provide at least the advantages described below. Accordingly, an aspect of the present invention is to provide techniques for advanced Automatic Repeat reQuest (ARQ) buffer management in a wireless communication system.

In accordance with an aspect of the present invention, a method for operating an ARQ transmitter in a wireless communication system is provided. The method includes determining unutilized capacity of an ARQ receiver buffer in an ARQ receiver, determining if the ARQ receiver buffer can support an ARQ block to be transmitted based on the determined unutilized capacity of the ARQ receiver buffer, and if it is determined that the ARQ receiver buffer can support the ARQ block to be transmitted, transmitting the ARQ block to the ARQ receiver.

In accordance with another aspect of the present invention, an ARQ transmitter apparatus for use in a wireless communication system is provided. The apparatus includes a receiver for receiving signals from at least one ARQ receiver, a transmitter for transmitting signals to the at least one ARQ receiver, and a controller.

The controller controls the receiver and transmitter, and determines unutilized capacity of an ARQ receiver buffer in an ARQ receiver, determines if the ARQ receiver buffer can support an ARQ block to be transmitted based on the determined unutilized capacity of the ARQ receiver buffer, and if it is determined that the ARQ receiver buffer can support the ARQ block to be transmitted, controls to transmit the ARQ block to the ARQ receiver.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
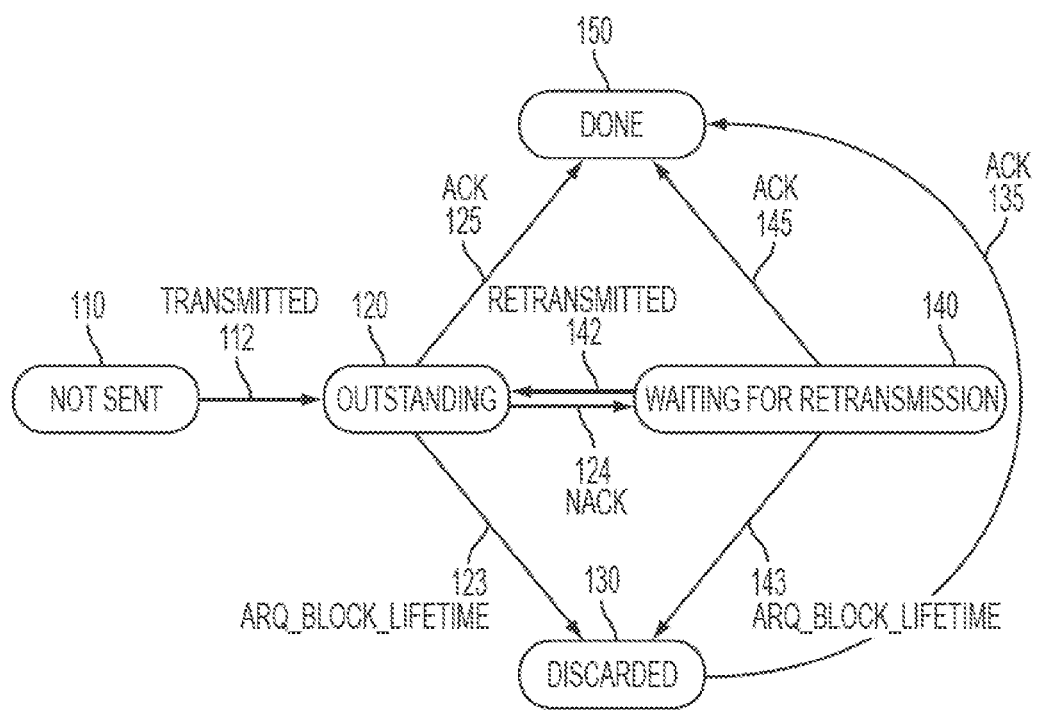
FIG. 1 illustrates an Automatic Repeat reQuest (ARQ) transmitter state machine for an ARQ block according to the related art.
Figure 2:
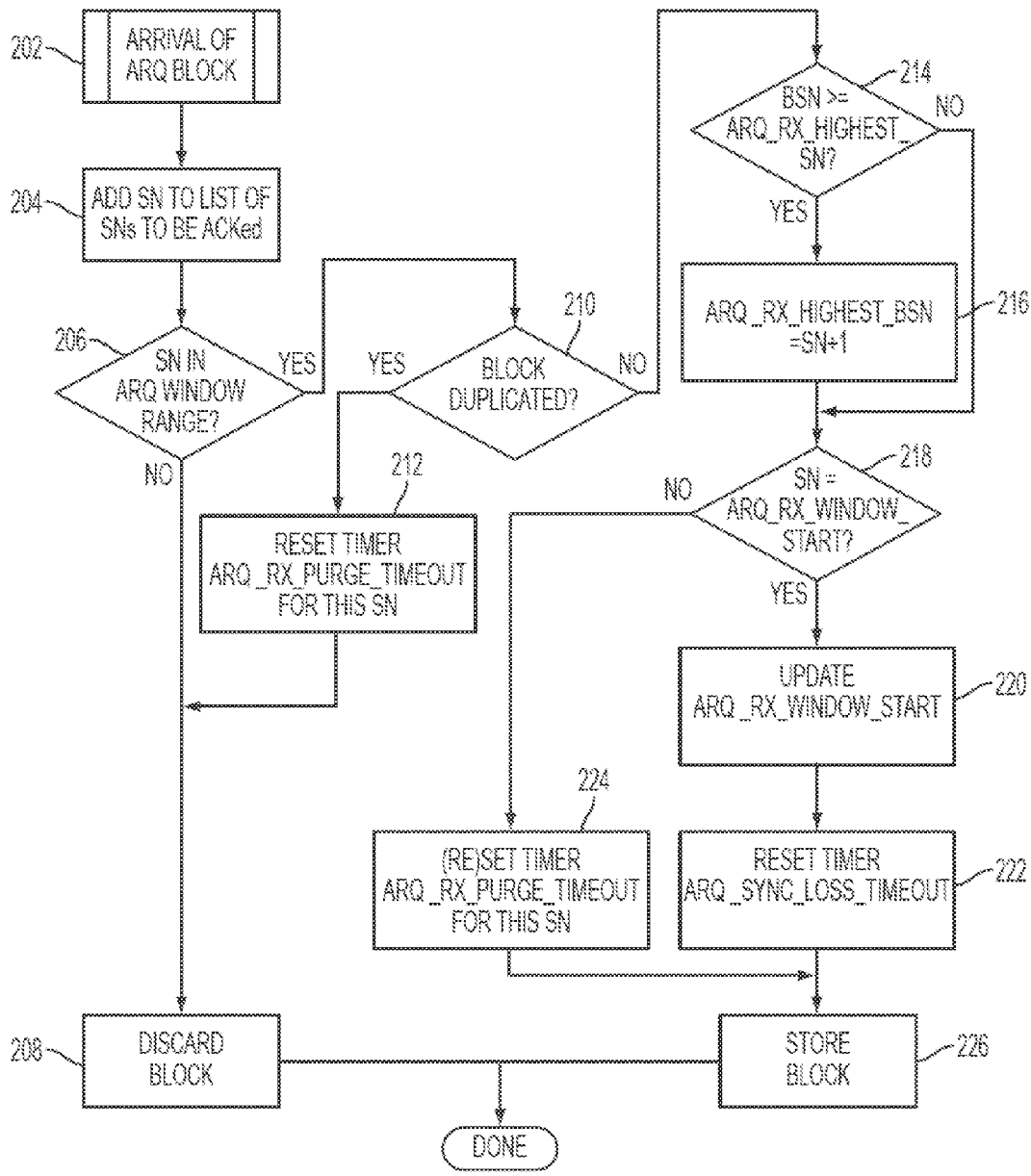
FIG. 2 illustrates a flowchart for reception of an ARQ block according to the related art.
Figure 3:
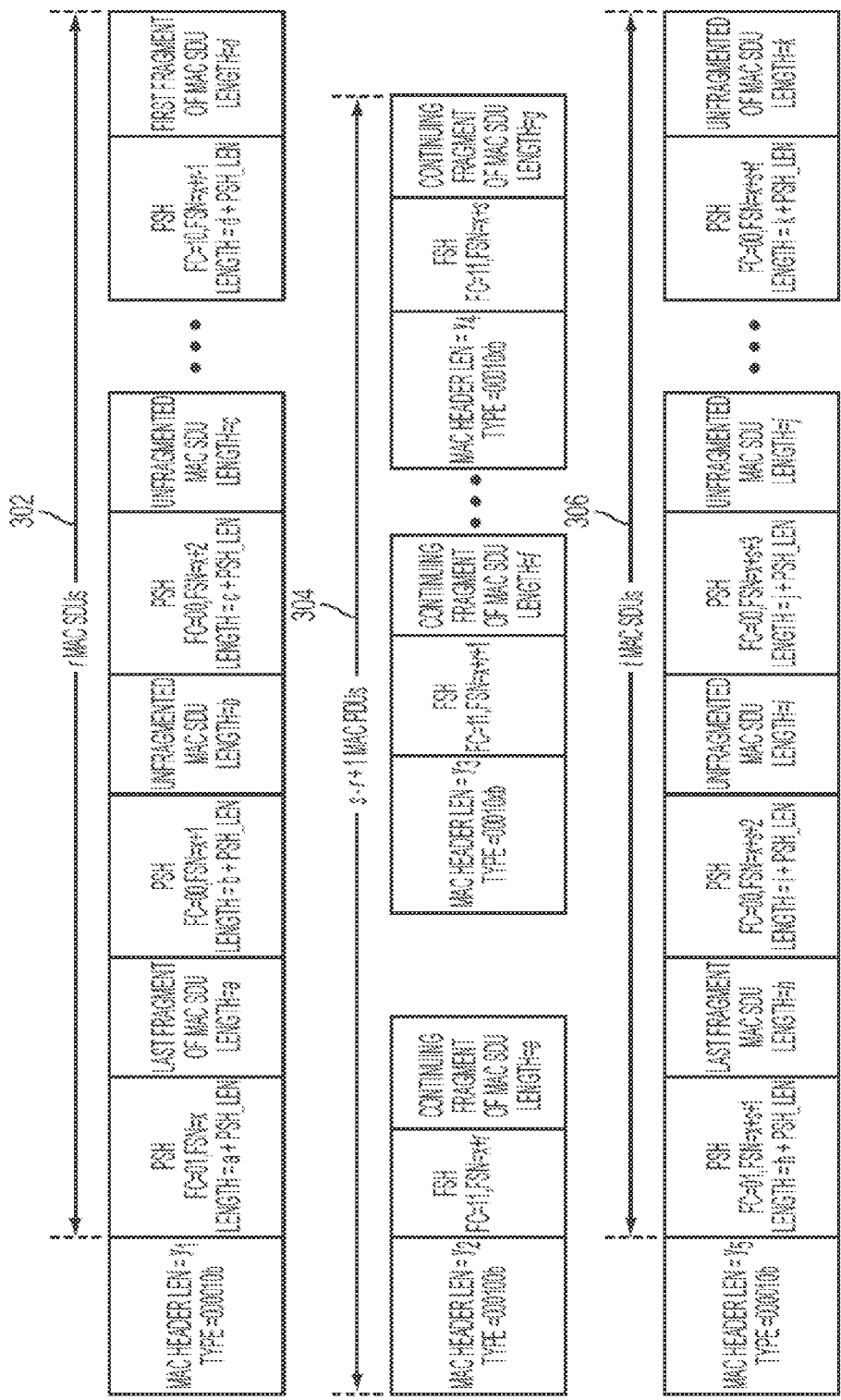
FIG. 3 illustrates variable-length Service Data Units (SDUs) packed into a Media Access Control (MAC) Packet Data Units (PDUs) including Fragmentation SubHeaders (FSHs) and a Packing SubHeaders (PSHs) according to the related art.
Figure 4:
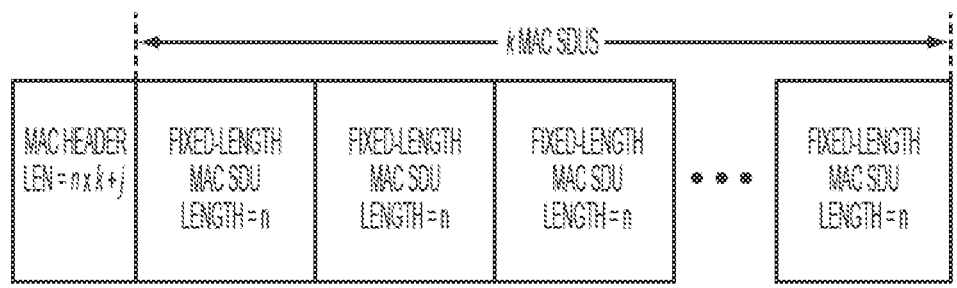
FIG. 4 illustrates fixed-length SDUs packed into one MAC PDU according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to techniques for Automatic Repeat reQuest (ARQ) in a wireless communication system. More specifically, exemplary embodiments of the present invention described below relate to techniques for advanced ARQ buffer management in a wireless communication system.

It should be understood that the following description might refer to terms utilized in various standards merely for simplicity of explanation. For example, the following description may refer to terms utilized in the Institute of Electrical and Electronics Engineers (IEEE) 802.16e standard, IEEE 802.16m standard or the 3$^{rd}$ Generation Partnership Project (3GPP) Long Term Evolution (LTE) standard. However, this description should not be interpreted as being limited to the IEEE 802.16e, IEEE 802.16m or 3GPP LTE standards. Independent of the mechanism used for ARQ, it is preferable to implemented advanced buffer management and it is advantageous for that ability to conform to a standardized mechanism.

First Exemplary Embodiment

A first exemplary embodiment of the present invention includes a technique for an ARQ transmitter to precisely determine an amount of utilization of an ARQ receiving buffer so that the ARQ transmitter does not transmit more than the ARQ receiver could support. An ARQ_MAX_BUFFER_SIZE parameter is a negotiation parameter between an AQR transmitter, such as Base Station (BS), and an ARQ receiver, such a Mobile Station (MS). ARQ_MAX_BUFFER_SIZE is the maximum size of the ARQ buffer (in bytes) that the ARQ receiver is able to allocate for all ARQ connections. The ARQ receiver informs the AQR transmitter of a maximum ARQ buffer size during capability negotiation. The AQR transmitter ensures that the new transmission of an ARQ block does not exceed ARQ_MAX_BUFFER_SIZE-ARQ_BUFFER_USED.

ARQ_BUFFER_USED denotes the total ARQ buffer usage of all ARQ enabled flows at the ARQ receiver. In other words, ARQ_BUFFER_USED denotes the sum of ARQ_BUFFER_USED per flow for all ARQ enabled flows at the ARQ receiver. ARQ_BUFFER_USED per flow is calculated as the occupied buffer size of an ARQ transmitter window (from ARQ_TX_WINDOW_START to ARQ_TX_NEXT_SN-1 (inclusive)). Here, if the ARQ blocks, with a Sequence Number (SN) smaller than ARQ_TX_WINDOW_START, are part of the same Media Access Control (MAC) Service Data Unit (SDU) as the first ARQ block in the ARQ transmitter window, then those ARQ blocks are be included in the calculation of ARQ_BUFFER_USED per flow. In other words, when determining the amount of utilization of an ARQ receiving buffer, the ARQ transmitter also considers ARQ blocks at the ARQ receiver as ARQ_BUFFER_USED if they have an SN smaller than ARQ_TX_WINDOW_START and are still waiting for complete SDU reconstruction before being delivered to an upper layer. An example of buffer occupation and the calculation of available buffer space are described below with reference to FIG. 7.

Figure 7:
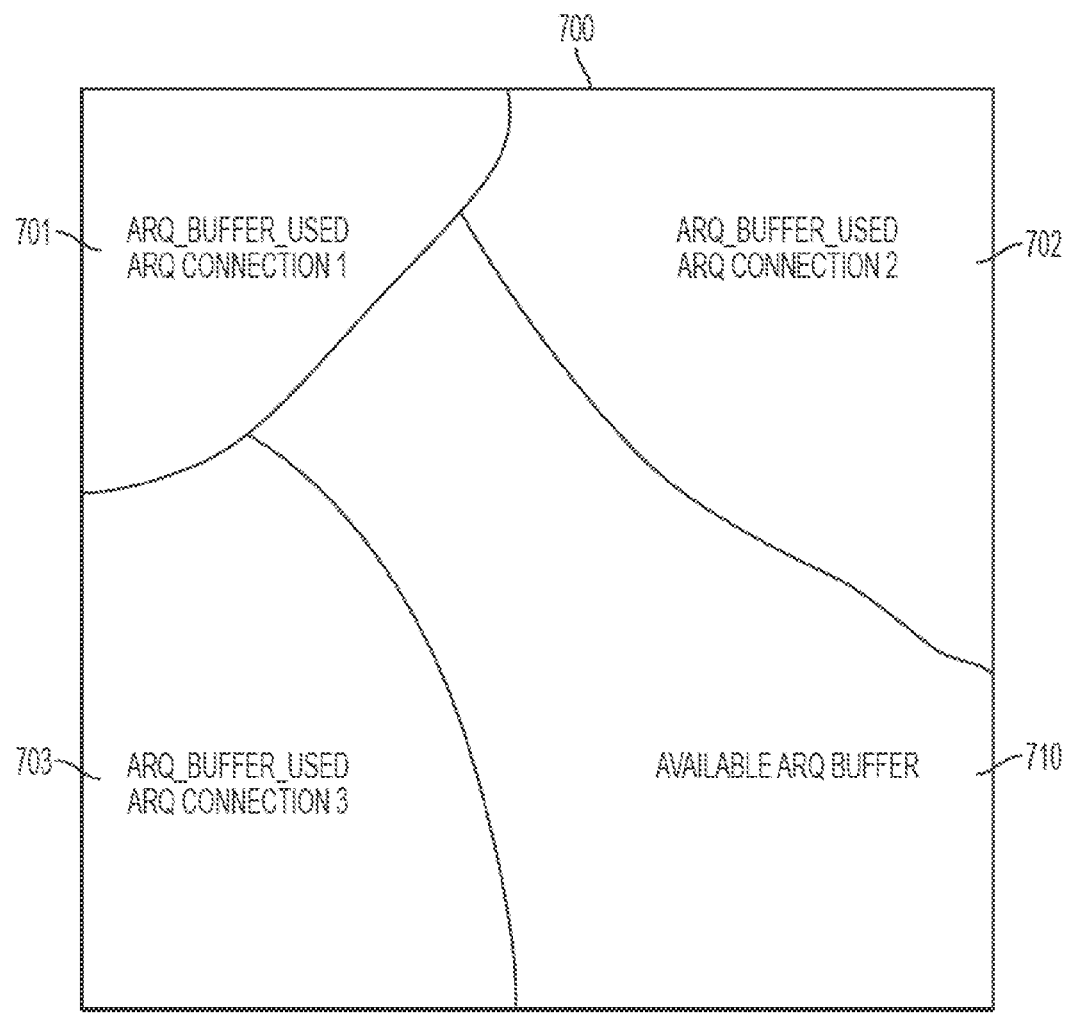
FIG. 7 illustrates buffer occupation and calculation of available buffer space according to an exemplary embodiment of the present invention.

FIG. 7 illustrates buffer occupation and calculation of available buffer space according to an exemplary embodiment of the present invention.

Referring to FIG. 7, three ARQ connections, including ARQ connection 1 701, ARQ connection 2 702, and ARQ connection 3 703, are shown sharing an ARQ buffer at an ARQ receiver. The ARQ transmitter is informed of the ARQ_MAX_BUFFER_SIZE, symbolized by the entire space inside the square 700. The ARQ transmitter determines the buffer occupation ARQ_BUFFER_USED for each ARQ connection considering all the ARQ blocks that are stored in the ARQ receiving buffer. The available ARQ buffer space 710 is determined as follows:

ARQ_MAX_BUFFER_SIZE-ARQ_BUFFER_USED_CONNECTION_$_1$-ARQ_BUFFER_USED_CONNECTION_$_2$-ARQ_BUFFER_USED_CONNECTION_$_3$

An example of buffer management for an ARQ connection will be described below with reference to FIG. 8.

Figure 8:
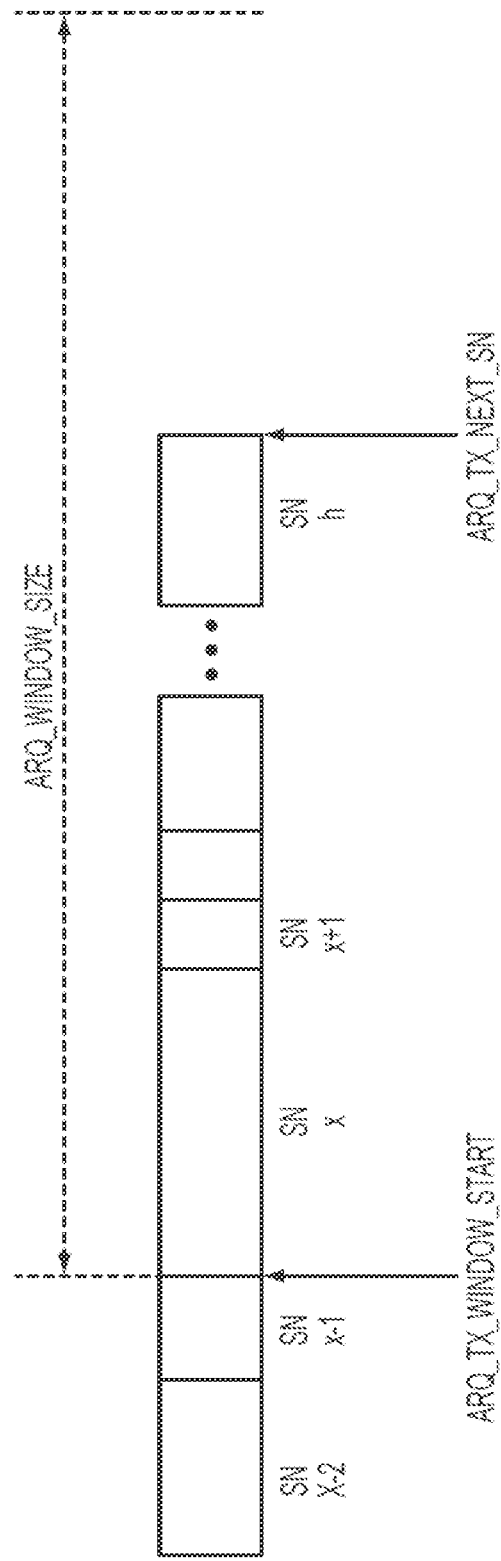
FIG. 8 illustrates buffer management for an ARQ connection according to an exemplary embodiment of the present invention.

FIG. 8 illustrates buffer management for an ARQ connection according to an exemplary embodiment of the present invention Referring to FIG. 8, an ARQ connection is shown. Herein, it is assumed that the lower edge of the ARQ receiving window points to SN=x. Having received an ACK, the ARQ transmitter moves the lower edge of the ARQ transmitting window to SN=x. However, the ARQ transmitter should include ARQ blocks of SN=x-1 and SN=x-2 when calculating ARQ_BUFFER_USED_CONNECTION_i because both ARQ blocks are still in the ARQ receiving buffer waiting for more data in order to reconstruct an SDU. Here, ARQ_BUFFER_USED_CONNECTION_i=sum(Size_of_ARQ_SN_k), where k=x-2, x-1, x, x+1, . . . , h.

Second Exemplary Embodiment

A second exemplary embodiment of the present invention includes a technique for deriving whether an ARQ block has been removed from the ARQ receiving buffer. The ARQ transmitter knows the fragmentation context for each transmitted packet. Thus, when an ARQ block is outside the ARQ transmitting window (also outside of the ARQ receiving window), the ARQ transmitter determines whether to include an ARQ block in the calculated ARQ_BUFFER_USED.

The ARQ transmitter determines whether to include an ARQ block in the calculated ARQ_BUFFER_USED by determining if the last bit of the ARQ block corresponds to the last bit of an SDU. If it is determined that the last bit of the ARQ block corresponds to the last bit of an SDU, all the ARQ blocks up to and including this ARQ block can be delivered to the upper layer, and thus none of the ARQ blocks needs to be included in the ARQ_BUFFER_USED.

Otherwise, if it is determined that the first bit of the ARQ block corresponds to the first bit of an SDU, all the ARQ blocks up to an excluding this ARQ block can be delivered to the upper layer, and thus none of the ARQ blocks up to and including this ARQ block needs to be included in the ARQ_BUFFER_USED.

The determination of whether to include an ARQ block in the calculated ARQ_BUFFER_USED using an FI field is described in more detail below with reference to FIG. 9.

Figure 9:
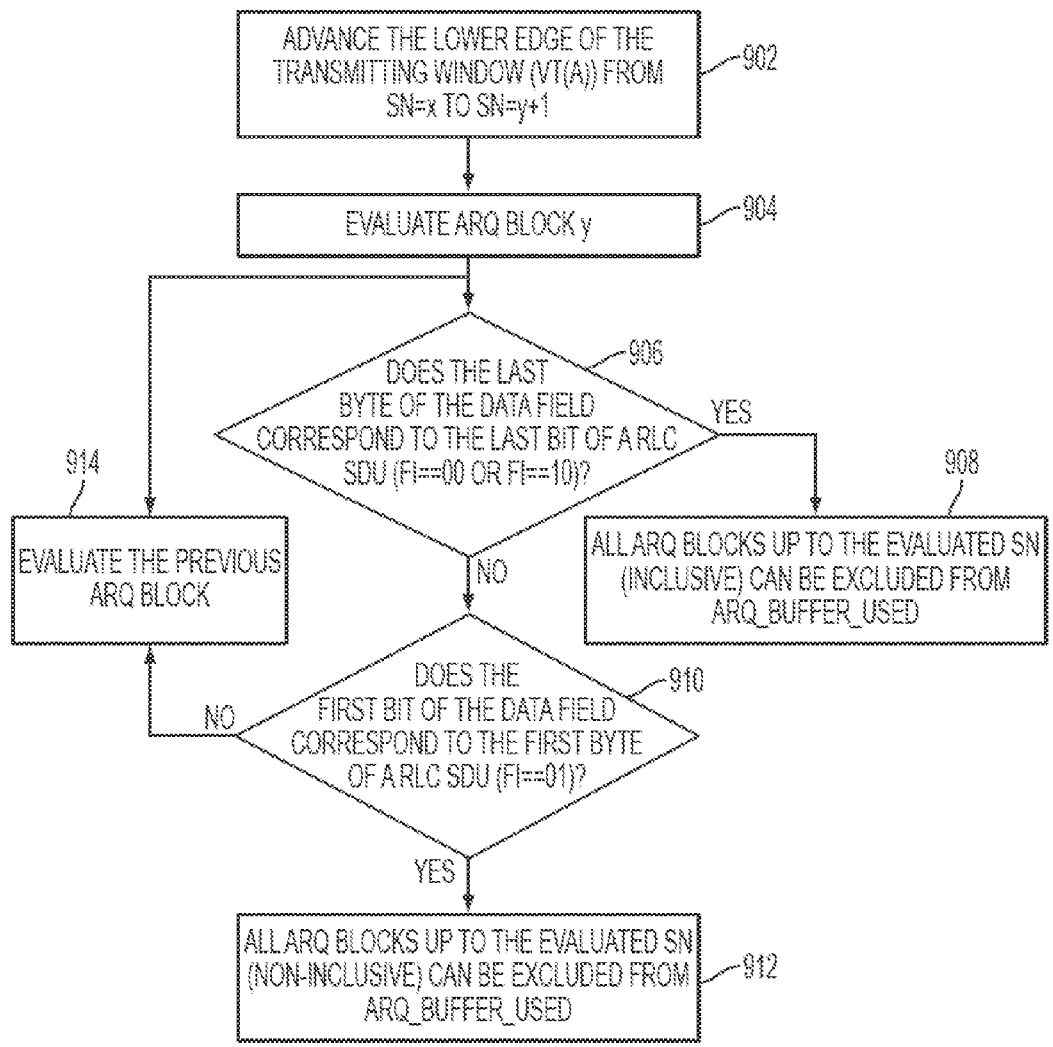
FIG. 9 illustrates a flowchart for determining whether to include an ARQ block in ARQ_BUFFER_USED using an FI field according to an exemplary embodiment of the present invention.

FIG. 9 illustrates a flowchart for determining whether to include an ARQ block in ARQ_BUFFER_USED using an FI field according to an exemplary embodiment of the present invention.

Referring to FIG. 9, the illustrated decision procedure is iterated backwards if the current ARQ block is a continuous fragment, until one of the conditions described above is met and the ARQ transmitter determines which ARQ blocks can be removed from the ARQ receiving buffer, and which ARQ blocks should still be included in the ARQ_BUFFER_USED, even if they are outside the ARQ transmitting and ARQ receiving windows. In the following example it is assumed that the ARQ transmitter determines that all ARQ blocks up to and not including SN=x−1 are removed from the ARQ receiving window. In step 902, the ARQ transmitter receives an ACK from the ARQ receiver, which allows the ARQ transmitter to advance the ARQ transmitting window from the previous lower edge SN=x to SN=y+1. In step 904, the ARQ transmitter evaluates the current block (i.e., ARQ block with SN=y).

In step 906, it is determined if the last bit of the ARQ block corresponds to the last bit of an SDU. The last bit of the ARQ block may be determined to correspond to the last bit of an SDU if FI=00 or if FI=10.

If it is determined that the last bit of the ARQ block corresponds to the last bit of an SDU, all the ARQ blocks up to and including the evaluated ARQ block (i.e., ARQ block with SN=y) can be delivered to upper layer in step 908 and thus can be excluded from ARQ_BUFFER_USED.

If it is determined that the last bit of the ARQ block does not corresponds to the last bit of an SDU, it is determined if the first bit of the ARQ block corresponds to the first bit of an SDU in step 910. The first bit of the ARQ block may be determined to correspond to the first bit of an SDU if FI=01.

If it is determined that the first bit of the ARQ block corresponds to the first bit of an SDU, all the ARQ blocks up to but not including the evaluated ARQ block (i.e., ARQ block with SN=y) can be delivered to upper layer in step 912 and thus can be excluded from ARQ_BUFFER_USED.

In contrast, if it is determined that the first bit of the ARQ block does not corresponds to the first bit of an SDU, the ARQ transmitter evaluates the previous ARQ block (i.e., ARQ block with SN=y−1) in step 914. Thereafter, the process returns to step 906.

The procedure continues until it has finished evaluating an ARQ block with SN=x if for the extreme case. Herein, all the ARQ blocks from SN=x−1 to SN=y remain waiting in the ARQ receiving buffer even though they are outside the ARQ receiving window.

Alternatively, the determination of whether to include an ARQ block in the calculated ARQ_BUFFER_USED may use an FC field. The determination of whether to include an ARQ block in the calculated ARQ_BUFFER_USED using an FC field is described in more detail below with reference to FIG. 10.

Figure 10:
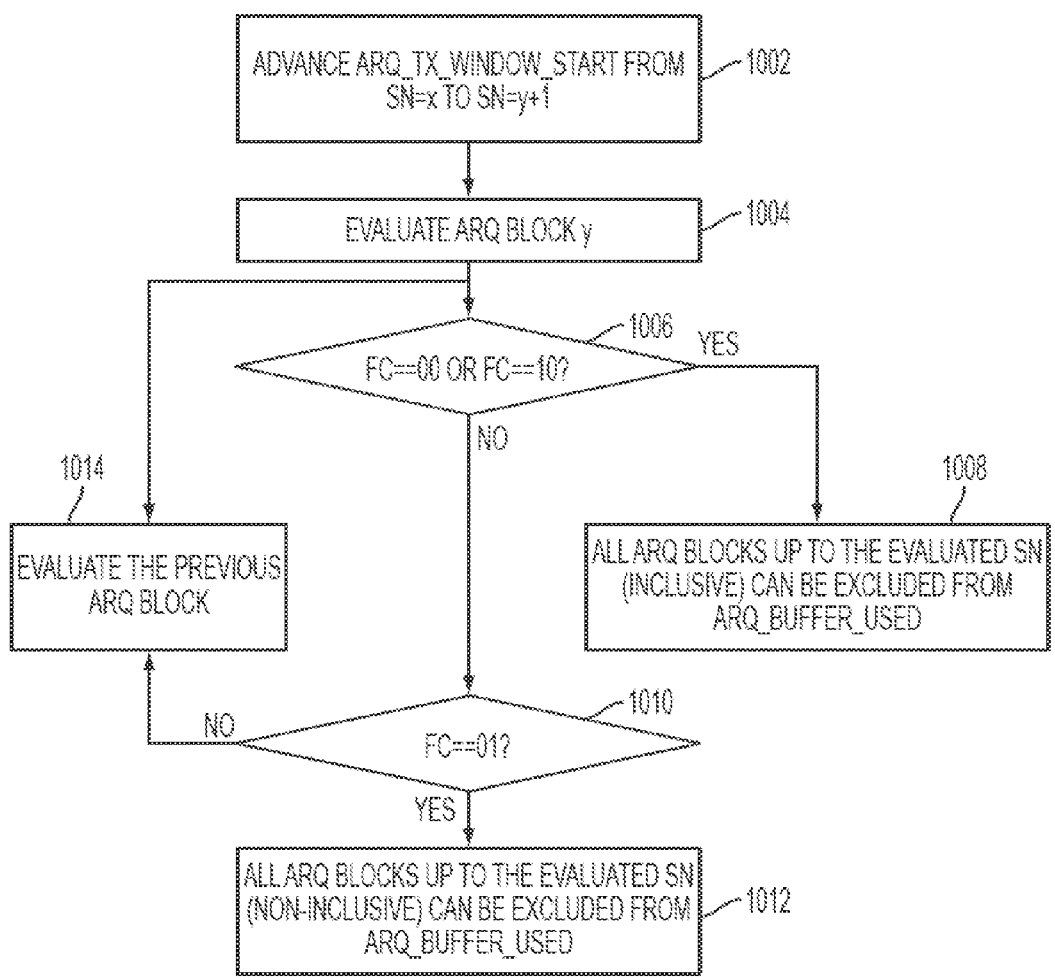
FIG. 10 illustrates a flowchart for determining whether to include an ARQ block in ARQ_BUFFER_USED using an FC field according to an exemplary embodiment of the present invention.

FIG. 10 illustrates a flowchart for determining whether to include an ARQ block in ARQ_BUFFER_USED using an FC field according to an exemplary embodiment of the present invention.

Referring to FIG. 10, the illustrated decision procedure is iterated backwards if the current ARQ block is a continuous fragment, until one of the conditions described above is met and the ARQ transmitter determines which ARQ blocks can be removed from the ARQ receiving buffer, and which ARQ blocks should still be included in the ARQ_BUFFER_USED, even if they are outside the ARQ transmitting and ARQ receiving windows. In the following example it is assumed that the ARQ transmitter determines that all ARQ blocks up to but not including SN=x−1 are removed from the ARQ receiving window. In step 1002, the ARQ transmitter receives an ACK from the ARQ receiver, which allows the ARQ transmitter to advance the ARQ transmitting window (ARQ_TX_WINDOW_START) from the previous lower edge SN=x to SN=y+1. In step 1004, the ARQ transmitter evaluates the current block (i.e., an ARQ block with SN=y).

In step 1006, it is determined if the last bit of the ARQ block corresponds to the last bit of an SDU. The last bit of the ARQ block may be determined to correspond to the last bit of an SDU if FC=00 or if FC=10.

If it is determined that the last bit of the ARQ block corresponds to the last bit of an SDU, all the ARQ blocks up to and including the evaluated ARQ block (i.e., ARQ block with SN=y) can be delivered to upper layer in step 1008 and thus can be excluded from ARQ_BUFFER_USED.

If it is determined that the last bit of the ARQ block does not correspond to the last bit of an SDU, it is determined if the first bit of the ARQ block corresponds to the first bit of an SDU in step 1010. The first bit of the ARQ block may be determined to correspond to the first bit of an SDU if FC=01.

If it is determined that the first bit of the ARQ block corresponds to the first bit of an SDU, all the ARQ blocks up to but not including the evaluated ARQ block (i.e., ARQ block with SN=y) can be delivered to upper layer in step 1012 and thus can be excluded from ARQ_BUFFER_USED.

In contrast, if it is determined that the first bit of the ARQ block does not corresponds to the first bit of an SDU, the ARQ transmitter evaluates the previous ARQ block (i.e., an ARQ block with SN=y−1) in step 1014. Thereafter, the process returns to step 1006.

The procedure continues until it has finished evaluating an ARQ block with SN=x if for the extreme case. Herein, all the ARQ blocks from SN=x−1 to SN=y remain waiting in the ARQ receiving buffer even though they are outside the ARQ receiving window.

Third Exemplary Embodiment

Figure 5:
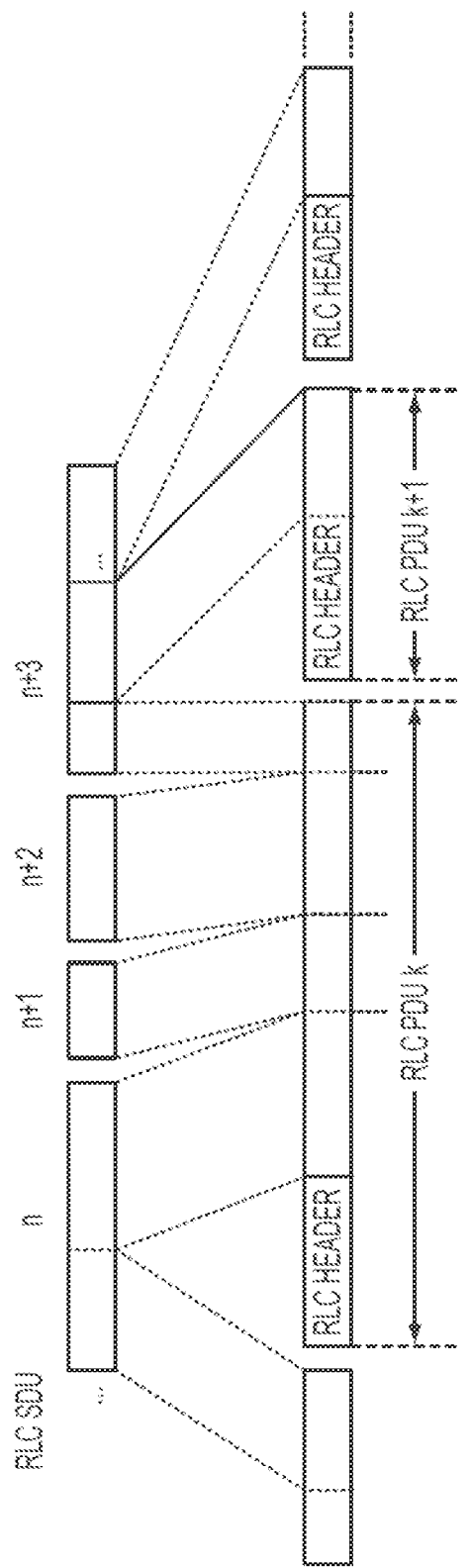
FIG. 5 illustrates a Radio Line Control (RLC) PDU structure according to the related art.
Figure 6:
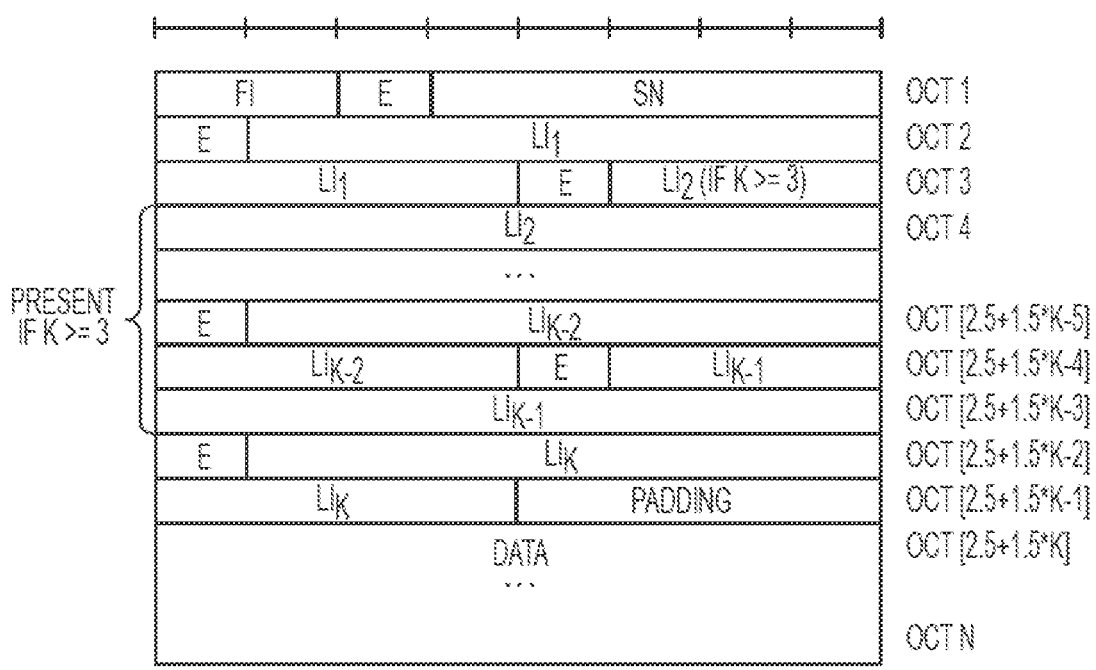
FIG. 6 illustrates an Unacknowledged Mode Data (UMD) PDU according to the related art.

A third exemplary embodiment of the present invention includes a technique where the ARQ transmitter does not have to include an entire ARQ block in the calculation of ARQ_BUFFER_USED if part of the ARQ block could be delivered to the upper layer in the ARQ receiver. For example, consider the scenario in FIG. 5 under the assumption that the ARQ transmitter has transmitted RLC PDUs up to k+10. Further assume that ARQ_TX_WINDOW_START is equal to k, which means that all PDUs up to but not including k have been acknowledged by the ARQ receiver. Accordingly, in this exemplary embodiment, ARQ_BUFFER_USED should include at least RLC PDU k−1 because SDU n cannot be reconstructed without RLC PDU k. Assuming that the ARQ receiver has acknowledged the reception of RLC PDU k, the ARQ transmitter determines that RLC SDU n, n+1 and n+2 can be reconstructed by the ARQ receiver, and thus RLC PDU k−1 may be excluded in ARQ_BUFFER_USED. Furthermore, only the last part of RLC PDU k needs to be included in ARQ_BUFFER_USED because the part corresponding to RLC SDU n, n+1 and n+2 can be removed from the ARQ receiving buffer and delivered to an upper layer.

Fourth Exemplary Embodiment

A fourth exemplary embodiment of the present invention includes a technique for the ARQ transmitter to determine whether to include an ARQ block in ARQ_BUFFER_USED using other information. Here, the ARQ transmitter discards an ARQ block with an SN corresponding to the lower edge of the current ARQ transmitting window, and informs the ARQ receiver. Having received acknowledgement from the ARQ receiver, the ARQ transmitter could safely preclude this ARQ block from the ARQ_BUFFER_USED because the ARQ receiver has discarded this ARQ block and advanced the ARQ receiving window. If the ARQ receiver maintains an ARQ_RX_PURGE_TIMEOUT timer, and when the timer expires at a SN=z, the ARQ receiver advances the ARQ receiving windows beyond SN=z. In this case, the ARQ receiver will remove all ARQ blocks with SN less than or equal to SN=z from the ARQ receiving buffer. Therefore, the ARQ transmitter may also maintain a similar timer so that after it receives acknowledgement from the ARQ receiver, it can exclude those ARQ blocks when calculating ARQ_BUFFER_USED.

Fifth Exemplary Embodiment

A fifth exemplary embodiment of the present invention includes a technique for using an information field in the ARQ feedback IE so that the ARQ receiver can explicitly inform the ARQ transmitter whether all ARQ blocks up to but not including the lower edge of the ARQ receiving window have been removed from the ARQ receiving buffer or not. An example of an IE used to inform the ARQ transmitter is shown in Table 4.

TABLE 4

| Syntax | Size (bit) | Notes |
|---|---|---|
| ARQ_feedback_IE(LAST){ | variable | |
| Flow ID | 4 | The ID of the flow being referenced |
| LAST | 1 | 0 = More ARQ Feedback IE in the list<br>1 = Last ARQ Feedback IE in the list |
| FLAG | 1 | 0 = Cumulative ACK<br>1 = Selective ACK MAP existence |
| SN | 10 | FLAG = 0, ARQ block up to and including SN has been received successfully.<br>FLAG = 1, ARQ block less than SN has been received successfully. |
| Buffer_Flag | 1 | FLAG = 0<br>Buffer_Flag = 0, ARQ blocks up to SN are removed from the receiving buffer.<br>Buffer_Flag = 1, at least ARQ block SN is still in the receiving buffer.<br>FLAG = 1<br>Buffer_Flag = 0, ARQ blocks up to SN-1 are removed from the receiving buffer.<br>Buffer_Flag = 1, at least ARQ block SN-1 is still in the receiving buffer. |
| While(FLAG == 1){ | | |
| Selective ACK MAP | 7 | Each bit represents ACK or NAK of corresponding ARQ block. '0' is NAK and '1' is ACK.<br>First MSB of first ACK MAP represents ACK or NAK information of SN. Contiguous bits after first MSB of first ACK MAP is corresponding to contiguous SN. |
| FLAG | 1 | 0 = No more selective ACK MAP<br>1 = Another set of selective ACK MAP and FLAG follows |
| } | | |
| } | | |

Figure 11:
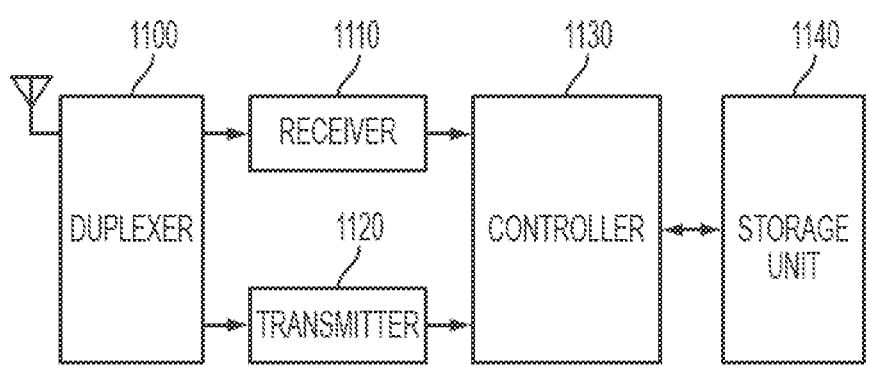
FIG. 11 is a block diagram illustrating an ARQ receiver in a wireless communication system according to an exemplary embodiment of the present invention.

FIG. 11 is a block diagram illustrating an ARQ receiver in a wireless communication system according to an exemplary embodiment of the present invention.

Referring to FIG. 11, the ARQ receiver includes a duplexer 1100, a receiver 1110, a transmitter 1120, a controller 1130, and a storage unit 1140. The ARQ receiver may include any number of additional structural elements. However, a description of additional structural elements of the ARQ receiver is omitted for conciseness. The ARQ receiver may be an MS in a wireless communication system.

The duplexer 1100 transmits a transmission signal provided from the transmitter 1120 via an antenna, and provides a reception signal from the antenna to the receiver 1110 according to a duplexing scheme.

The receiver 1110 converts the reception signal provided from the duplexer 1100 into a baseband signal, and provides the baseband signal to the controller 1130. For example, when the wireless communication system uses an Orthogonal Frequency Division Multiplexing (OFDM) scheme, the receiver 1110 includes a Radio Frequency (RF) processor, an Analog/Digital Converter (ADC), an OFDM demodulator, and a decoder. Accordingly, the RF processor converts an RF signal provided from the duplexer 1100 into a baseband analog signal. The ADC converts the analog signal provided from the RF processor into digital sample data. The OFDM demodulator transforms sample data in a time domain provided from the ADC into data in a frequency domain by performing a Fast Fourier Transform (FFT). The decoder demodulates and decodes a signal provided from the OFDM demodulator according to a Modulation and Coding Scheme (MCS) level.

The controller 1130 controls overall operations of the ARQ receiver. The operations of the ARQ receiver include any of the operations explicitly or implicitly described above as being performed by an ARQ receiver.

The transmitter 1120 converts a transmission signal into an RF signal, and provides the RF signal to the duplexer 1100 under control of the controller 1130. For example, when the wireless communication system uses an OFDM scheme, the transmitter 1120 includes an encoder, an OFDM modulator, a Digital/Analog Converter (DAC) and an RF processor. The encoder encodes and modulates a transmission signal according to an MCS level under control of the controller 1130. The OFDM modulator converts data in the frequency domain provided from the encoder into sample data (i.e., an OFDM symbol) in a time domain by performing an Inverse FFT (IFFT). The DAC converts sample data provided from the OFDM modulator into an analog signal. The RF processor converts a baseband analog signal provided from the DAC into an RF signal.

The storage unit 1140 stores programs required for overall operations of the ARQ receiver and various data. Also, the storage unit 1140 may be used as the ARQ receiver buffer.

Figure 12:
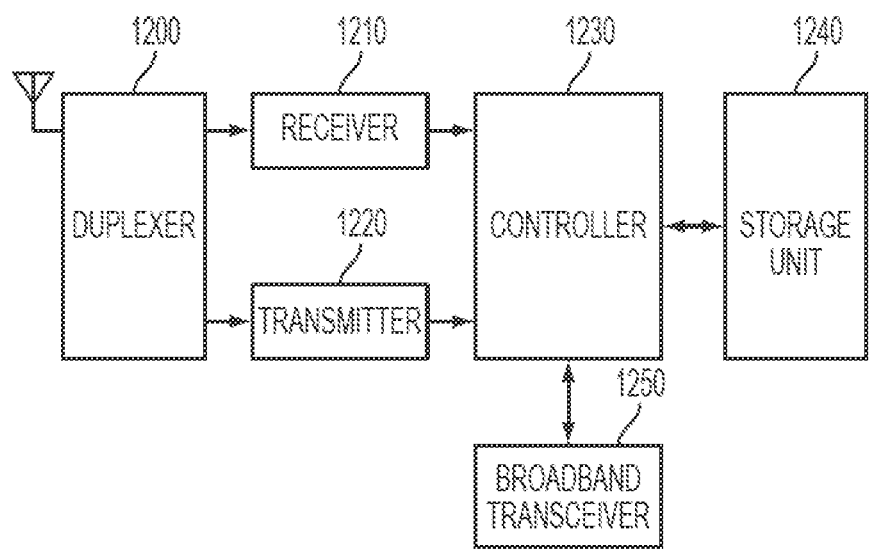
FIG. 12 is a block diagram illustrating an ARQ transmitter in a wireless communication system according to an exemplary embodiment of the present invention.

FIG. 12 is a block diagram illustrating an ARQ transmitter in a wireless communication system according to an exemplary embodiment of the present invention.

Referring to FIG. 12, the ARQ transmitter includes a duplexer 1200, a receiver 1210, a transmitter 1220, a controller 1230, a storage unit 1240, and a broadband transceiver 1250. The ARQ transmitter may include any number of additional structural elements. However, a description of additional structural elements of the ARQ transmitter is omitted for conciseness. The ARQ transmitter may be a BS in a wireless communication system.

The duplexer 1200 transmits a transmission signal provided from the transmitter 1220 via an antenna, and provides a reception signal from the antenna to the receiver 1210 according to a duplexing scheme.

The receiver 1210 converts a reception signal provided from the duplexer 1200 into a baseband signal and provides the baseband signal to the controller 1230. For example, when the wireless communication system uses an OFDM scheme, the receiver 1210 includes an RF processor, an ADC, an OFDM demodulator and a decoder. The RF processor converts an RF signal provided from the duplexer 1200 into a baseband analog signal. The ADC converts the analog signal provided from the RF processor into digital sample data. The OFDM demodulator converts sample data in the time domain provided from the ADC into data in the frequency domain by performing FFT. The decoder demodulates and decodes a signal provided from the OFDM demodulator according to an MCS level.

The controller 1230 controls overall operations of the ARQ transmitter. The operations of the ARQ transmitter include any of the operations explicitly or implicitly described above as being performed by the ARQ transmitter. For example, the controller 1230 may determine unutilized capacity of an ARQ receiver buffer in an ARQ receiver, determine if the ARQ receiver buffer can support an ARQ block to be transmitted based on the determined unutilized capacity of the ARQ receiver buffer, and if it is determined that the ARQ receiver buffer can support the ARQ block to be transmitted, control to transmit the ARQ block to the ARQ receiver.

The transmitter 1220 converts a transmission signal into an RF signal and provides the RF signal to the duplexer 1200 under control of the controller 1230. For example, when the wireless communication system uses an OFDM scheme, the transmitter 1220 includes an encoder, an OFDM modulator, a Digital/Analog Converter (DAC) and an RF processor. The encoder encodes and modulates a transmission signal according to an MCS level under control of the controller 1230. The OFDM modulator converts data in the frequency domain provided from the encoder to sample data (i.e., an OFDM symbol) in the time domain by performing IFFT. The DAC converts sample data provided from the OFDM modulator into an analog signal. The RF processor converts a baseband analog signal provided from the DAC into an RF signal.

The storage unit 1240 stores programs required for overall operations of the ARQ transmitter and various data.

The broadband transceiver 1250 facilities communication with at least one other entity in a Core Network (CN) of a wireless communication system, such as a wireless communication system operating according to the, IEEE 802.16e, IEEE 802.16m, or 3GPP LTE standards. The broadband transceiver 1250 may be omitted.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating an Automatic Repeat reQuest (ARQ) transmitter in a wireless communication system, the method comprising:
   determining unutilized capacity of an ARQ receiver buffer in an ARQ receiver;
   determining if the ARQ receiver buffer can support an ARQ block to be transmitted based on the determined unutilized capacity of the ARQ receiver buffer; and
   if it is determined that the ARQ receiver buffer can support the ARQ block to be transmitted, transmitting the ARQ block to the ARQ receiver.

2. The method of claim 1, wherein the determining of the unutilized capacity of the ARQ receiver buffer in the ARQ receiver comprises:

receiving information from the ARQ receiver corresponding to a maximum size of the ARQ receiver buffer;

determining a summed amount of utilization of the ARQ receiver buffer, wherein the summed amount of utilization of the ARQ receiver buffer comprises a summation of an amount of utilization of the ARQ receiver buffer for each of one or more ARQ flows; and subtracting the summed amount of utilization of the ARQ receiver buffer from the maximum size of the ARQ receiver buffer.

3. The method of claim 1, wherein the determining of the unutilized capacity of the ARQ receiver buffer in the ARQ receiver comprises determining ARQ blocks as utilizing the ARQ receiver buffer for any ARQ blocks within an ARQ transmit window and any ARQ blocks outside the ARQ transmit window that are waiting for Media Access Control (MAC) Service Data Unit (SDU) reconstruction.

4. The method of claim 1, wherein the determining of the unutilized capacity of the ARQ receiver buffer in the ARQ receiver comprises determining ARQ blocks as utilizing the ARQ receiver buffer for any ARQ blocks within an ARQ transmit window and any ARQ blocks outside the ARQ transmit window that are part of the same Media Access Control (MAC) Service Data Unit (SDU) as the first ARQ block within the ARQ transmit window.

5. The method of claim 1, wherein the determining of the unutilized capacity of the ARQ receiver buffer in the ARQ receiver comprises:

determining if a last bit of an ARQ block outside an ARQ transmit window corresponds to a last bit of a Media Access Control (MAC) Service Data Unit (SDU); and if it is determined that the last bit of the ARQ block outside the ARQ transmit window corresponds to the last bit of the MAC SDU, determining ARQ blocks as utilizing the ARQ receiver buffer for any ARQ blocks within an ARQ transmit window and any ARQ blocks outside the ARQ transmit window, except for ARQ blocks up to and including the ARQ block outside the ARQ transmit window, that are waiting for MAC SDU reconstruction.

6. The method of claim 5, wherein it is determined that the last bit of the ARQ block outside the ARQ transmit window corresponds to the last bit of the MAC SDU if its Field Interpretation (FI) value is one of '00' and '10'.

7. The method of claim 5, wherein it is determined that the last bit of the ARQ block outside the ARQ transmit window corresponds to the last bit of the MAC SDU if its Fragment Control (FC) value is one of '00' and '01'.

8. The method of claim 5, wherein the determining of the unutilized capacity of the ARQ receiver buffer in the ARQ receiver further comprises:

if it is determined that the last bit of the ARQ block outside the ARQ transmit window does not correspond to the last bit of the MAC SDU, determining if a first bit of the ARQ block outside an ARQ transmit window corresponds to a first bit of a Media Access Control (MAC) Service Data Unit (SDU); and if it is determined that the first bit of the ARQ block outside the ARQ transmit window corresponds to the first bit of the MAC SDU, determining ARQ blocks as utilizing the ARQ receiver buffer for any ARQ blocks within an ARQ transmit window and any ARQ blocks outside the ARQ transmit window, except for ARQ blocks up to but not including the ARQ block outside the ARQ transmit window, that are waiting for MAC SDU reconstruction.

9. The method of claim 8, wherein it is determined that the first bit of the ARQ block outside the ARQ transmit window corresponds to the first bit of the MAC SDU if its Field Interpretation (FI) value is '01'.

10. The method of claim 8, wherein it is determined that the first bit of the ARQ block outside the ARQ transmit window corresponds to the first bit of the MAC SDU if its Fragment Control (FC) value is '10'.

11. The method of claim 1, wherein the determining of the unutilized capacity of the ARQ receiver buffer in the ARQ receiver comprises determining ARQ blocks as utilizing the ARQ receiver buffer for any ARQ blocks within an ARQ transmit window and any portions of ARQ blocks outside the ARQ transmit window that are waiting for Media Access Control (MAC) Service Data Unit (SDU) reconstruction.

12. The method of claim 1, wherein the determining of the unutilized capacity of the ARQ receiver buffer in the ARQ receiver comprises determining ARQ blocks as utilizing the ARQ receiver buffer for any ARQ blocks within an ARQ transmit window and any ARQ blocks outside the ARQ transmit window for which an acknowledgment from the ARQ receiver has been received and a corresponding purge timer has not expired.

13. The method of claim 1, wherein the determining of the unutilized capacity of the ARQ receiver buffer in the ARQ receiver comprises determining ARQ blocks as utilizing the ARQ receiver buffer for any ARQ blocks within an ARQ transmit window and any ARQ blocks outside the ARQ transmit window for which an indication is received from the ARQ receiver indicating one or more ARQ blocks that have not been removed from the ARQ receiver buffer.

14. An ARQ transmitter apparatus for use in a wireless communication system, the apparatus comprising:

a receiver for receiving signals from at least one ARQ receiver;

a transmitter for transmitting signals to the at least one ARQ receiver; and a controller that controls the receiver and transmitter, and determines unutilized capacity of an ARQ receiver buffer in an ARQ receiver, determines if the ARQ receiver buffer can support an ARQ block to be transmitted based on the determined unutilized capacity of the ARQ receiver buffer, and if it is determined that the ARQ receiver buffer can support the ARQ block to be transmitted, controls to transmit the ARQ block to the ARQ receiver.

15. The apparatus of claim 14, wherein the controller, when determining the unutilized capacity of the ARQ receiver buffer in the ARQ receiver, controls to receive information from the ARQ receiver corresponding to a maximum size of the ARQ receiver buffer, determines a summed amount of utilization of the ARQ receiver buffer, wherein the summed amount of utilization of the ARQ receiver buffer comprises a summation of an amount of utilization of the ARQ receiver buffer for each of one or more ARQ flows, and subtracts the summed amount of utilization of the ARQ receiver buffer from the maximum size of the ARQ receiver buffer.

16. The apparatus of claim 14, wherein the controller, when determining the unutilized capacity of the ARQ receiver buffer in the ARQ receiver, determines ARQ blocks as utilizing the ARQ receiver buffer for any ARQ blocks within an ARQ transmit window and any ARQ blocks outside the ARQ transmit window that are waiting for Media Access Control (MAC) Service Data Unit (SDU) reconstruction.

17. The apparatus of claim 14, wherein the controller, when determining the unutilized capacity of the ARQ receiver buffer in the ARQ receiver, determines ARQ blocks as utilizing the ARQ receiver buffer for any ARQ blocks within an ARQ transmit window and any ARQ blocks outside the ARQ transmit window that are part of the same Media Access Control (MAC) Service Data Unit (SDU) as the first ARQ block within the ARQ transmit window.

18. The apparatus of claim 14, wherein the controller, when determining the unutilized capacity of the ARQ receiver buffer in the ARQ receiver, determines if a last bit of an ARQ block outside an ARQ transmit window corresponds to a last bit of a Media Access Control (MAC) Service Data Unit (SDU), and wherein, if the controller determines that the last bit of the ARQ block outside the ARQ transmit window corresponds to the last bit of the MAC SDU, the controller determines ARQ blocks as utilizing the ARQ receiver buffer for any ARQ blocks within an ARQ transmit window and any ARQ blocks outside the ARQ transmit window, except for ARQ blocks up to and including the ARQ block outside the ARQ transmit window, that are waiting for MAC SDU reconstruction.

19. The apparatus of claim 18, wherein the controller determines that the last bit of the ARQ block outside the ARQ transmit window corresponds to the last bit of the MAC SDU if its Field Interpretation (FI) value is one of '00' and '10'.

20. The apparatus of claim 18, wherein the controller determines that the last bit of the ARQ block outside the ARQ transmit window corresponds to the last bit of the MAC SDU if its Fragment Control (FC) value is one of '00' and '01'.

21. The apparatus of claim 18, wherein if the controller determines that the last bit of the ARQ block outside the ARQ transmit window does not correspond to the last bit of the MAC SDU, the controller determines if a first bit of an ARQ block outside an ARQ transmit window corresponds to a first bit of a Media Access Control (MAC) Service Data Unit (SDU), and wherein, if the controller determines that the first bit of the ARQ block outside the ARQ transmit window corresponds to the first bit of the MAC SDU, the controller determines ARQ blocks as utilizing the ARQ receiver buffer for any ARQ blocks within an ARQ transmit window and any ARQ blocks outside the ARQ transmit window, except for ARQ blocks up to but not including the ARQ block outside the ARQ transmit window, that are waiting for MAC SDU reconstruction.

22. The apparatus of claim 18, wherein the controller determines that the first bit of the ARQ block outside the ARQ transmit window corresponds to the first bit of the MAC SDU if its Field Interpretation (FI) value is '01'.

23. The apparatus of claim 18, wherein the controller determines that the first bit of the ARQ block outside the ARQ transmit window corresponds to the first bit of the MAC SDU if its Fragment Control (FC) value is '10'.

24. The apparatus of claim 14, wherein the controller, when determining the unutilized capacity of the ARQ receiver buffer in the ARQ receiver, determines ARQ blocks as utilizing the ARQ receiver buffer for any ARQ blocks within an ARQ transmit window and any portions of ARQ blocks outside the ARQ transmit window that are waiting for Media Access Control (MAC) Service Data Unit (SDU) reconstruction.

25. The apparatus of claim 14, wherein the controller, when determining the unutilized capacity of the ARQ receiver buffer in the ARQ receiver, determines ARQ blocks as utilizing the ARQ receiver buffer for any ARQ blocks within an ARQ transmit window and any ARQ blocks outside the ARQ transmit window for which an acknowledgment from the ARQ receiver has been received and a purge timer has not expired.

26. The apparatus of claim 14, wherein the controller, when determining the unutilized capacity of the ARQ receiver buffer in the ARQ receiver, determines ARQ blocks as utilizing the ARQ receiver buffer for any ARQ blocks within an ARQ transmit window and any ARQ blocks outside the ARQ transmit window for which an indication is received from the ARQ receiver indicating one or more ARQ blocks that have not been removed from the ARQ receiver buffer.

* * * * *